United States Patent [19]

Florence

[11] 3,993,607
[45] Nov. 23, 1976

[54] SMOKE-SUPPRESSANT AND FIRE-RETARDANT POLY(VINYL CHLORIDE) COMPOSITIONS

[75] Inventor: David M. Florence, Lancaster, Pa.

[73] Assignee: Armstrong Cork Company, Lancaster, Pa.

[22] Filed: May 9, 1974

[21] Appl. No.: 468,490

Related U.S. Application Data

[63] Continuation of Ser. No. 312,740, Dec. 6, 1972, abandoned.

[52] U.S. Cl. .................... 260/2.5 FP; 260/2.5 P; 260/2.5 H; 260/23 XA; 260/31.8 M; 260/31.8 DR; 260/31.8 W; 260/42.49; 260/891; 260/45.75 P; 260/DIG. 24

[51] Int. Cl.² .................... C08K 3/26; C08K 3/22; C08J 9/36

[58] Field of Search ............ 260/2.5 FP, DIG. 24, 260/45.75 R, 2.5 P, 2.5 AJ, 45.7 R, 45.75 P, 891

[56] References Cited
UNITED STATES PATENTS

| | | |
|---|---|---|
| 2,840,534 | 6/1958 | Clark et al. .................... 260/2.5 FP |
| 2,853,400 | 9/1958 | Ahlbin ............................ 260/2.5 P |
| 3,172,852 | 3/1965 | Lobos ............................. 252/8.1 |
| 3,418,267 | 12/1968 | Busse ........................... 260/45.75 R |
| 3,468,839 | 9/1969 | Millane ......................... 260/45.7 R |
| 3,639,298 | 2/1972 | Lister et al. .................. 260/2.5 FP |
| 3,697,456 | 10/1972 | Pitts et al. .................... 260/2.5 AJ |
| 3,699,041 | 10/1972 | Sanderford et al. ........... 260/2.5 FP |

FOREIGN PATENTS OR APPLICATIONS

1,028,323   5/1966   United Kingdom ............ 260/45.75

Primary Examiner—Wilbert J. Briggs, Sr.

[57] ABSTRACT

The propensity of poly(vinyl chloride) homopolymer and poly(vinyl chloride) copolymer resin-containing compositions including poly(vinyl chloride) modified rubbers to smoke on exposure to fire is greatly diminished by the addition of effective amounts of ferric oxide. Amounts in excess of about 5%, based on the weight of the poly(vinyl chloride) resin or poly(vinyl chloride) modified resin or rubber, act as an effective smoke suppressant. Additionally, the combination of ferric oxide with hydrated metallic compounds results in poly(vinyl chloride) homopolymer and copolymer-containing compositions having both low smoke and low flame spread characteristics.

4 Claims, No Drawings

SMOKE-SUPPRESSANT AND FIRE-RETARDANT POLY(VINYL CHLORIDE) COMPOSITIONS

This application is a continuing application of U.S. application Ser. No. 312,470 filed Dec. 6, 1972, now abandoned.

BACKGROUND OF THE INVENTION

1. Field of the Invention

This invention relates generally to the field of fire retardancy and specifically to poly(vinyl chloride) homopolymer and copolymer resin-containing compositions which generate less smoke and less flame spread when exposed to fire.

2. DESCRIPTION OF THE PRIOR ART

It is known from U.S. Pat. No. 3,560,441 to add antimony trioxide to resinous compositions including those containing poly(vinyl chloride) homopolymers and copolymers for the purpose of imparting flame retardancy and low smoke characteristics. The use of metal carbonates including the carbonates of magnesium in dry chemical fire extinguisher compositions is also known from U.S. Pat. No. 3,172,852, and the use of various oxides including ferric oxide to aid in forming a char when a polyamide is at its pyrolysis temperature is known from U.S. Pat. No. 3,418,267.

SUMMARY OF THE INVENTION

Recent evaluation of the pyrolysis products of poly(vinyl chloride) including homopolymers and copolymers copolymerized with minor amounts of monomers such as vinyl acetate and polypropylene has shown that among the principal products are benzene and toluene, both of which are known contributors to smoke. It has now been found that the addition of small but effective amounts of ferric oxides to poly(vinyl chloride)-containing resin compositions including poly(vinyl chloride) homopolymers and copolymers containing major amounts of vinyl chloride significantly reduces the amount of benzene and toluene emitted during pyrolysis and apparently catalyzes the breakdown to other compounds such as to increase the amount of $C_1 - C_6$ aliphatic hydrocarbons formed at the expense of benzene and high molecular weight aromatic hydrocarbons.

It being known that benzene and high molecular weight aromatic hydrocarbons are prime smoke generators during fires, there appears to be a correlation between the smoke emitted from a poly(vinyl chloride)-containing composition and the amount of benzene and toluene given off, those compositions compounded with ferric oxide giving off significantly lower amounts of benzene and higher molecular weight hydrocarbons and also significantly lower amounts of smoke. When, in addition, poly(vinyl chloride) homopolymer and copolymer-containing resin compositions are compounded with effective amounts of hydrated metallic compounds, the flame spread rating of the compositions so compounded is, at the same time, lowered and the compositions appear significantly more resistant to burning. Thus, the combination of ferric oxide and hydrated metallic compounds as additives to poly(vinyl chloride) homopolymer and copolymer-containing resinous compositions results in significantly more fire-retardant compositions having significantly lowered propensities for creating smoke in the event of fire.

DESCRIPTION OF THE PREFERRED EMBODIMENTS

Evaluation of the pyrolysis products of poly(vinyl chloride) may be summarized as follows.

A series of samples were prepared containing poly(vinyl chloride) homopolymer resin (Diamond 450) and two parts, per hundred parts of resin, of dibutyl tin bis octyl maleate stabilizer. A second series of samples were prepared containing the poly(vinyl chloride) homopolymer resin (Diamond 450) and two parts, per hundred parts by weight of resin, of dibutyl tin bis octyl maleate stabilizer and two parts, per hundred parts by weight of resin, of ferric oxide. Accurately weighed samples of the formulations were pyrolyzed, and the amount of hydrochloric acid given off by the polymer was measured by peak height. The amount of hydrochloric acid released during pyrolysis of poly(vinyl chloride) was shown to be quantitative. This was true whether or not the metal oxide additive was present although the pyrolysis of the poly(vinyl chloride) homopolymer resin containing the two parts by weight of metal oxide per hundred parts by weight of resin showed a slight decrease in the amount of hydrochloric acid given off, which would be accounted for by the amount of hydrochloric acid absorbed by the metal oxide. The small change in the amount of hydrochloric acid released clearly shows that the organic pyrolysis products are not changing in such a way that larger amounts of chlorinated aromatics are formed.

Standard samples and those containing the ferric oxide additive were pyrolyzed in air and helium, and in both cases the pyrolysis products were separated on two columns, the first a parapak Q column, which separates the $C_1 - C_7$ fraction, and the second a 21-foot dexsil column, which separates the $C_6 - C_{12}$ fractions. A comparison of the iron oxide-containing samples with the standard showed that, for the metal-containing polymer, all other products are increasing relative to benzene. Benzene, toluene and and naphthalene all show a considerable decrease for the ferric oxide-containing polymers relative to the standard. In general, the net result of the addition of small amounts of ferric oxide to poly(vinyl chloride) homopolymer on the polymer degradation reaction is to increase the amount of $C_1 - C_6$ aliphatic hydrocarbons formed at the expense of benzene and higher molecular weight aromatic hydrocarbons.

Although the amount of smoke from the metal oxide-containing poly(vinyl chloride) samples showed a significant decrease, the flammability of the samples did not. This was to be expected from the pyrolysis pattern since the amount of light hydrocarbons, good fuels, increased relative to the amount of poor fuels, the aromatic hydrocarbons (smoke generators). The analysis by gas chromatography of the pyrolysis of the poly(vinyl chloride) mixtures showed the amount of benzene and toluene generated to be reduced approximately 40% to 50% when pyrolyzing those samples containing the ferric oxide; this correlated with a 40% to 50% smoke reduction using the NBS smoke chamber for those samples in which the ferric oxide was present.

Generally, we have found that the incorporation of ferric oxide when compounding resinous compositions containing poly(vinyl chloride) homopolymer and copolymer resins, in particular plasticized poly(vinyl chloride) resins and poly(vinyl chloride) modified rubbers, significantly reduces the propensity of these compositions to generate smoke on burning, and further evaluation of compounded poly(vinyl chloride) compositions and resinous compositions containing mixtures of poly(vinyl chloride) with other resinous materials confirmed the above. In order to significantly reduce the propensity of the resinous compositions to generate smoke on burning, it is preferable to incorporate, on compounding the compositions, from 5 to 75 parts by weight ferric oxide, based on 100 parts by weight of resin, a marked reduction in smoke density being achieved at levels of $Fe_2O_3$ of about 5% and above.

The flame spreads of the compositions of this invention are also materially reduced by incorporating, while compounding, in addition to the ferric oxide, from 5 to 200 parts by weight of a hydrated metallic compound based on the total weight of the resinous components in the compositions. In particular, hydrated compounds of magnesium carbonate containing five or six waters of hydration have been found to be particularly effective in reducing the flame spread of such resinous compositions while still achieving the significant reduction in smoke from the incorporation of the ferric oxide. Other hydrated metallic compounds such as aluminum trihydrate also significantly reduce the flame spread of these compositions, although the use of the hydrated magnesium carbonates gives compositions having reduced flame spreads over a wider temperature range.

The following examples will serve to more fully illustrate the invention.

EXAMPLES 1-14

A master batch was made up of the following ingredients:

| Ingredients | Parts by Weight |
| --- | --- |
| Paracril OZO-50 (a 50–50 mixture of a poly(vinyl chloride) homopolymer and an acrylonitrile-butadiene rubber having approximately 30% acrylonitrile and 70% butadiene) | 200.0 |
| EPO (Epoxidized soybean oil) | 8.0 |
| Admex 710 (epoxidized soybean oil) | 16.0 |
| Thermax-carbon black (medium thermal) | 40.0 |
| Santicizer 160 (butyl benzyl phthalate) | 20.0 |
| Di 2-ethyl hexyl phthalate | 24.0 |
| Antimony trioxide ($Sb_2O_3$) | 13.3 |

The poly(vinyl chloride) modified rubber was first added to a Banbury mixer and the remaining ingredients, including ferric oxide and hydrated magnesium carbonate in the amounts indicated under Table I, were added incrementally with thorough mixing up to a temperature of about 280° to 300° F. After thorough mixing, the mixture was sheeted out on a two roll rubber mill and cooled.

The master batch thus formed was compounded by mixing 482 parts by weight of the master batch with 1.0 parts by weight of diphenyl guanidine, 2.5 parts by weight of zinc diethyldithiocarbamate, 8 parts by weight of spider sulfur, a fine grade sulfur, and 44 parts by weight of Celogen-OT [p,p'-oxybis (benzene sulfonylhydrazide)] in a Banbury mixer at 150° F. maximum temperature until thorough mixing of the ingredients was achieved. This mix was then sheeted out on a two roll rubber mill and cooled. It was then re-milled and warmed and strips (at 110° F.) were removed and fed directly to an extruder. The compounded poly(vinyl chloride) modified rubber was extruded as a sheet of about 0.26 inch thickness. The sheet was cooled, cut into samples about 10 inches × 5 inches and the samples were expanded and cured in an oven to give cellular modified rubber sheets about 0.56 inches in thickness. The cure cycle utilized in the oven was five minutes at 220° F., a 20 minute rise to 300° F. and a final cure at 300° F. for five minutes.

The cured cellular sheets were trimmed to a 0.50 inch thickness and cut to proper sample size for smoke and flame spread testing. Samples for the smoke test were three inches square and those tested for flame spread rating were 3¾ inches in width and 30 inches in length.

Table I, reproduced hereinbelow, sets forth the amounts of ferric oxide (iron red oxide NR 4284 from Charles Pfizer and Company) and hydrated magnesium carbonate added in compounding the poly(vinyl chloride)-rubber samples tested. Flame spread ratings and smoke densities as well as sample densities are given for each of the examples.

TABLE I

| | % by Weight | | 30/30 Tunnel Test(1) | N.B.S. Smoke(2) Dm | Test |
| --- | --- | --- | --- | --- | --- |
| | $Fe_2O_3$ | $(MgCO_3)4Mg(OH)_2 \cdot 5H_2O$ | FSR | (Corr.) | Density |
| Ex. 1 | — | — | 113 | 584 | 5.0 |
| 2 | 0.25 | | 111 | 606 | 5.9 |
| 3 | 0.50 | | 109 | 583 | 5.1 |
| 4 | 2.0 | | 109 | 547 | 5.1 |
| 5 | 5.0 | | 104 | 439 | 5.3 |
| 6 | 10.0 | | 91 | 367 | 5.2 |
| 7 | 15.0 | | 87 | 344 | 5.0 |
| 8 | 30.0 | | 83 | 356 | 5.0 |
| 9 | 60.0 | | 77 | 215 | 4.8 |
| 10(3) | 10.0 | | 96 | 355 | 5.3 |
| 11 | 5.0 | 20.0 | 85 | 400 | 5.0 |
| 12 | 5.0 | 10.0 | 99 | 388 | 5.1 |
| 13 | 10.0 | 20.0 | 84 | 415 | 5.2 |

TABLE I-continued

| | % by Weight | | 30/30 Tunnel Test(1) | N.B.S. Smoke(2) Dm | Test |
|---|---|---|---|---|---|
| | $Fe_2O_3$ | $(MgCO_3)4Mg(OH)_2.5H_2O$ | FSR | (Corr.) | Density |
| 14 | 10.0 | 10.0 | 86 | 372 | 4.9 |

(1)The FSR is a measurement of the flame spread rating achieved in a 30/30 Tunnel Test, a standard test reported in the April 1967 Journal of Cellular Plastics in an article by M. M. Levy entitled "A Simplified Method for Determining Flame Spread."

(2)"Method for Measuring Smoke From Burning Materials" by D. Cross et al; A.S.T.M. Special Technical Publication No. 422 (1967). Measurements made on Model 4-5800, Aminco-NBS Smoke Density Chamber, American Instrument Company (Average value from three tests).

(3)Example 10 was prepared from a master batch in which the amount of carbon black was reduced from 40 parts to 30 parts in the master batch to give a filler level equivalent to the control (Ex. 1) and to show that the reduction in smoke is not due to the filler level ($Fe_2O_3$ plus carbon black) but to the level of $Fe_2O_3$ present.

Examples 1–14 clearly illustrate that the smoke producing propensity of poly(vinyl chloride) resin-containing compositions can be dramatically reduced by adding effective amounts of $Fe_2O_3$ to the compositions. Furthermore, the flame spread ratings for these compositions can be lowered at the same time by adding effective amounts of a hydrated metallic compound. This is somewhat surprising in view of the level of antimony trioxide (a prior art smoke suppressant) present in all of the compositions tested.

What is claimed is:

1. A resin composition containing a poly(vinyl chloride) homopolymer or copolymer, wherein the copolymer contains a major portion of vinyl chloride and, as a smoke suppressant and fire retardant, between about 5.0 and 75 parts by weight $Fe_2O_3$ and between about 5.0 and 200 parts by weight of a hydrated magnesium carbonate containing a high degree of hydration per one hundred parts resin.

2. The resin composition of claim 1 wherein the resin component consists essentially of plasticized poly(vinyl chloride) homopolymer or copolymer.

3. The resin composition of claim 1 wherein the resin is a poly(vinyl chloride) modified rubber composition which has been compounded with said $Fe_2O_3$ and hydrated magnesium carbonate.

4. The resin composition of claim 3 wherein said resin is a cellular poly(vinyl chloride) modified acrylonitrilebutadiene rubber.

* * * * *

UNITED STATES PATENT OFFICE
CERTIFICATE OF CORRECTION

PATENT NO. : 3,993,607
DATED : November 23, 1976
INVENTOR(S) : David M. Florence It is certified that error appears in the above-identified patent and that said Letters Patent are hereby corrected as shown below:

Column 1, line 4, the Ser. No. "312,470" should read --312,740--.

Signed and Sealed this

Fifteenth Day of February 1977

[SEAL]

Attest:

RUTH C. MASON
Attesting Officer

C. MARSHALL DANN
Commissioner of Patents and Trademarks